P. SUHR.
HORSE DETACHER.
APPLICATION FILED APR. 7, 1910.
978,507.
Patented Dec. 13, 1910.
2 SHEETS—SHEET 1.
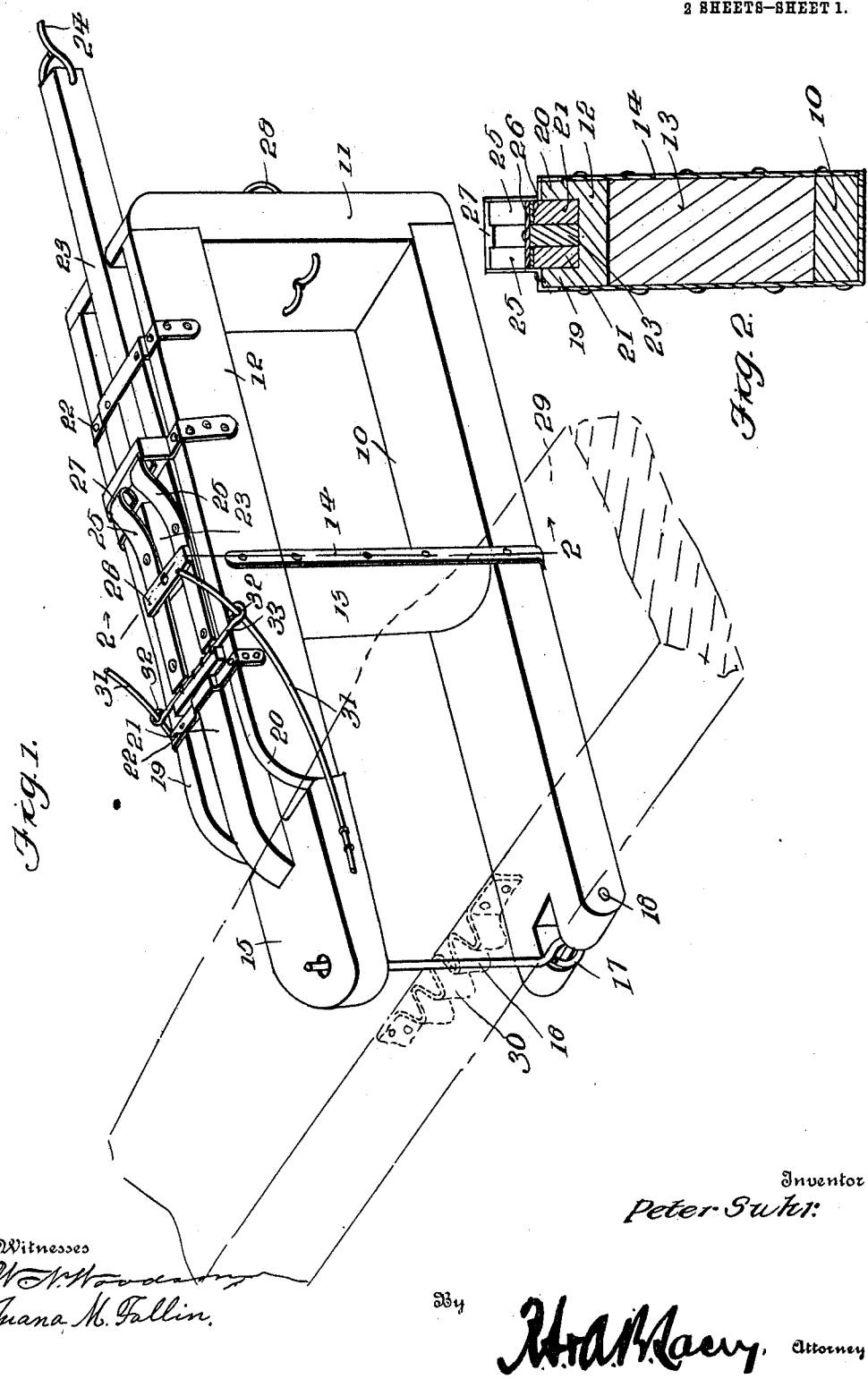
Inventor
Peter Suhr.
Witnesses
W. N. Woodcock
Juana M. Fallin.
By
H. A. H. Lacey, Attorneys.

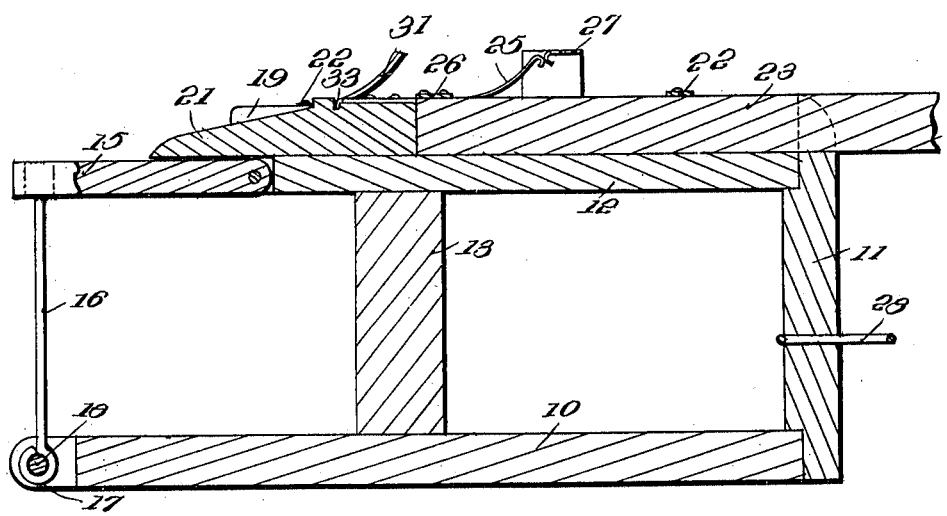
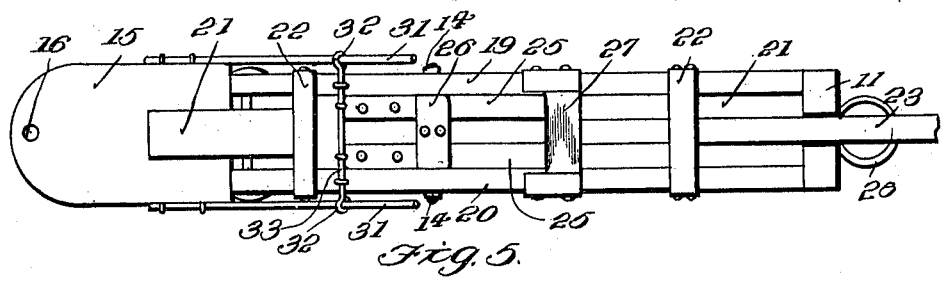
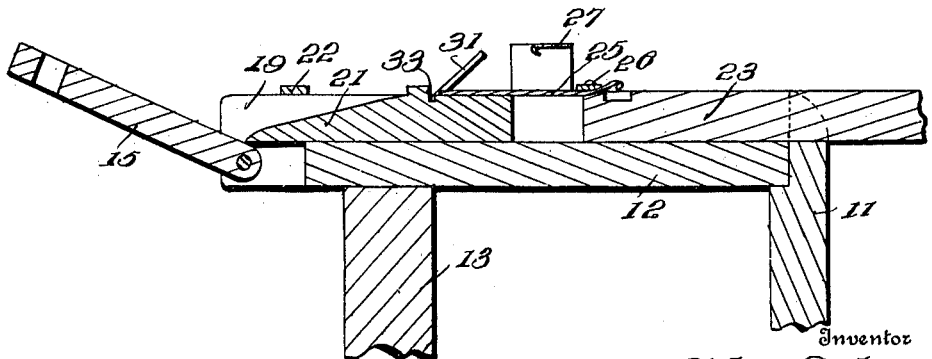

UNITED STATES PATENT OFFICE.

PETER SUHR, OF SCHLESWIG, IOWA.

HORSE-DETACHER.

978,507.  Specification of Letters Patent.  Patented Dec. 13, 1910.

Application filed April 7, 1910. Serial No. 553,958.

*To all whom it may concern:*

Be it known that I, PETER SUHR, a citizen of the United States, residing at Schleswig, in the county of Crawford and State of Iowa, have invented certain new and useful Improvements in Horse-Detachers, of which the following is a specification.

This invention relates to devices for attaching draft animals to vehicles, implements, and other objects to be drawn and refers particularly to a device adapted to quickly release the draft animal from the vehicle or other device.

This invention contemplates the provision of a device of this nature by means of which the swingletree or doubletree employed is securely held to the vehicle or implement to be drawn, and which is provided with improved means whereby the tree may be released by the movement of a lever so that the same may be detached quickly from the device.

The invention has for another object the provision of a device of this nature which is so constructed that the same may be made in different sizes to accord with the strength required, and which is so constructed that the operative parts particularly the parts upon which the greatest strain is exerted, are solidly formed and are secured in coöperative relation in such a manner as to embody durability and strength in the complete device.

For a full understanding of the invention reference is to be had to the following description and accompanying drawings, in which:—

Figure 1 is a perspective view of the complete device disclosing a tree secured to the same. Fig. 2 is a transverse section on the line 2—2 of Fig. 1. Fig. 3 is a longitudinal vertical section through the device in a closed position. Fig. 4 is a top plan view of the same, and Fig. 5 is a detail sectional view through the forward end of the device disclosing the same in an open position.

Corresponding and like parts are referred to in the following description and indicated in all the views of the drawings by the same reference characters.

Referring to the drawings the numeral 10 designates the base of the device which is provided with an arm 11 extending upwardly from the rear extremity of the same and which is secured to the rear end of a guide 12. The guide 12 projects forwardly from the arm 11 in parallel relation with the base 10 and is held rigidly in such position by the provision of a block 13 disposed midway between the ends of the same. The block 13, as disclosed by the drawings, is preferably reinforced by the provision of a strap 14 engaging along the opposite edges of the block 13 and terminating at its upper extremities upon the opposite sides of the guide 12. The guide 12 terminates forwardly at a point inwardly of the extremity of the base 10, and hingedly carries a leaf 15 extending outwardly therefrom in registration with the forward end of the base 10, and is adapted to coöperate with the base 10 in supporting a locking pin 16.

The locking pin 16 comprises an elongated member having an eye 17 upon its lower extremity through which a pintle 18 engages to hingedly support the pin 16. The pintle 18 engages transversely through the forward end of the base 10, the base 10 being recessed at its extremity for the reception of the eye 17. The leaf 15 is vertically apertured for the reception of the upper end of the locking pin 16 in order to retain the same in a substantially vertical position when the leaf is dropped thereover. The guide 12 is provided at its opposite sides with upwardly extending flanges 19 and 20 between which is slidably disposed a sliding bolt 21. The sliding bolt 21 is retained between the flanges 19 and 20 by straps 22 positioned adjacent to the opposite ends of the flanges 19 and 20 over the upper edges of the same, the sliding bolt 21 being reciprocated beneath the same to move outwardly over the leaf 15 in order to prevent the upward swinging of the same to retain the locking pin 16 in position. The rear extremity of the sliding bolt 21 is forked for the reception of a lever 23 slidably engaging therein and which extends rearwardly through the arm 11 and is provided with a cable 24 or the like for the purpose of reciprocating the same within the guide 12 and between the arms of the sliding bolt 21. The sliding bolt 21 carries a pair of leaf springs 25 which are overturned at their rear extremities and curved upwardly from the upper face of the sliding bolt 21, the same being engaged by a cross-head 26 which is carried upon the upper face of the lever 23 at the forward end thereof. The flanges 19 and 20 are further provided with a stop 27 which is secured across the same and which is raised at its intermediate portion to normally engage against the overturned rear extremities of the leaf springs 25 to prevent the backward movement of the sliding bolt 21 and to thereby retain the same in a forwardly extended position to lock the leaf 15 from upward movement. The forward extremity of the lever 23 normally abuts against the rear end of the sliding bolt 21 and is adapted to slide backwardly between the arms thereof in order to carry the cross-head 26 over the upper edges of the leaf springs 25 for the purpose of depressing the same from engagement with the stop 27. For the purpose of mounting the device upon a clevis or the like a swivel hook 28 is rearwardly extended from the arm 11 at an intermediate point thereof. A tree 29 is positioned between the base 10 and the leaf 15 and is provided at its forward edge with a plurality of vertical serrations 30 which are preferably formed from a strap which is transversely crimped and secured in any suitable manner upon the forward edge of the tree 29. The serrated portion of the tree 29 is adapted to form a suitable engagement with the locking pin 16 in order to dispose the tree 29 upon the device and to lock the same in such position against longitudinal movement. For the purpose of automatically raising the leaf 15 from engagement with the upper extremity of the locking pin 16 a pair of arcuate arms 31 are rearwardy and upwardly extended from the leaf 15 at the opposite sides of the same and are engaged through loops 32 formed upon the opposite extremities of a transverse bar 33 carried upon the upper face of the sliding bolt 21.

The operation of the device is as follows:—When it is desired to release the tree 29 the lever 23 is drawn backwardly whereby the cross-head 26 is caused to ride over the upper faces of the leaf springs 25 and to depress the rear extremities of the same from engagement with the stop 27. Owing to the turned over portions of the leaf springs 25 the rear extremities of the same are prevented from depression into alinement with the forward ends thereof and to thereby form raised portions or abutments against which the cross-head 26 is engaged when the sliding bolt 21 is then retracted from the leaf 15 upon the further backward movement of the lever 23. As the sliding bolt 21 is moved backwardly the bar 33 is carried therewith and the arcuate arms 31 are caused to slide through the eyes or loops 32 to depress the rear extremities of the same and to thereby raise the hinged leaf 15 out of engagement with the upper extremity of the locking pin 16. It is readily observed that the tree 29 will now fall forward from between the base 10 and the leaf 15 and that the draft animals may readily and quickly be detached. The cable 24 is preferably formed of rigid material so as to cause the forward movement of the lever 23 when it is desired to force the sliding bolt 21 forwardly and to lock the pin 16 in position. When the tree 29 is adjusted between the base 10 and leaf 15 the pin 16 is swung upwardly into engagement beneath the leaf 15 when the lever 23 is pushed forwardly whereby the leaf springs 25 are released and the forward end of the lever 23 abuts against the rear extremity of the sliding bolt 21 and causes the forward sliding of the bolt 21 upon further movement of the lever 23. During this operation the bar 33 is carried forwardly and the arcuate arms 31 are permitted to rise over the side of the leaf 15 which engages the upper extremity of the bar 16 and locks the same. The springs 25 being now freed, engage against the forward edge of the stop 27 and prevent the accidental displacement of the sliding bolt 21, thereby securely locking the device in position.

Having thus described the invention what is claimed as new is:—

1. A device as specified comprising a body portion, a block carried by said body portion, a locking pin carried by said body portion, a tree disposed between said block and said locking pin, a leaf carried by said body portion for normal engagement with said locking pin, a guide formed on said body portion, a sliding bolt positioned in said guide for engagement with said leaf to retain the same upon said locking pin, a stop carried by said guide, a pair of leaf springs carried by said bolt for engagement with said stop to prevent the retraction of the same, a lever slidably disposed through said guide and said bolt, a cross-head carried at the forward extremity of said lever for engagement over said springs to depress the same from said stop and to retract said bolt, and means carried by said bolt and connected to said hinged leaf for the purpose of automatically releasing said leaf from engagement with said locking pin upon the retraction of said bolt.

2. In combination with a tree of a frame for engagement with said tree, a locking pin carried upon said frame to secure said tree thereto, a hinged leaf carried by said frame for retaining said pin in position, a sliding bolt carried by said frame to engage said leaf, a cross-bar carried by said bolt, loops formed upon the opposite extremities of said cross-bar, arcuate arms rearwardly extended from said leaf for engagement through said loops and a lever carried by said frame for reciprocating said bolt.

3. A device as specified comprising a base, an arm upwardly extended from the rear end of said base, a guide carried by said arm and extended parallel with said base, a block positioned between said base and said guide intermediately thereof, a locking pin hingedly disposed in the forward end of said base and extended upwardly therefrom, a hinged leaf carried by said guide for engagement with said locking pin, a bolt slidably positioned on said guide to engage said leaf to retain the same against said pin, a cross-bar carried by said bolt, arcuate arms carried by said leaf and engaged slidably with said cross-bar to raise said leaf at times, a stop carried by said guide, springs disposed on said bolt for normal engagement with said stop, a lever slidably mounted on said guide and in said bolt, and a cross-head carried by said lever for engagement with said springs to release the same from said stop and to retract said bolt.

4. A horse detacher including a body portion, a locking pin pivoted at one end and at one side of the body portion, a leaf hinged at the opposite side and at the end of the body portion to receive the free end of the locking pin therethrough, a longitudinally slidable bolt carried by the body portion and engaging over the leaf to retain the same in engagement with the locking pin, and positive lifting means disposed between the sliding bolt and the leaf for raising the leaf from engagement with the locking pin when the bolt is retracted.

In testimony whereof I affix my signature in presence of two witnesses.

PETER SUHR. [L. S.]

Witnesses:
  W. F. BANK,
  JULIUS CHRISTIANSEN.